Patented Jan. 23, 1923.

1,443,094

UNITED STATES PATENT OFFICE.

HIDEMATSU SASA, OF TOKYO, JAPAN.

METHOD OF MAKING PHTHALIC ANHYDRIDE.

No Drawing.  Application filed October 21, 1919. Serial No. 332,322.

*To all whom it may concern:*

Be it known that I, HIDEMATSU SASA, of Tokyo, Japan, a Japanese subject, have invented a new and useful Method of Making Phthalic Anhydride, of which the following is a specification.

The object of my invention is to effect in a very efficient manner the production of phthalic anhydride from nitro-naphthalene. A further object of my invention is to manufacture phthalic anhydride by the action of sulphuric acid on nitro-naphthalene.

A further object of my invention is to furnish a process by which phthalic anhydride may be manufactured economically with ordinary sulphuric acid and a cheap metal such as iron without using mercury or fuming sulphuric acid.

Further objects and features of my invention are hereinafter more particularly set forth in the following description and statement of claims.

To my best knowledge phthalic anhydride has been prepared heretofore by oxidizing naphthalene in the presence of mercuric salts with fuming sulphuric acid. The use of salts or oxides of the rare metals such as cerium, lanthanum, neodymium, praseodymium, and ytterbium, has been proposed instead of mercury. But I am not aware that it has been tried to produce phthalic anhydride from nitro-naphthalene instead of naphthalene using such a metal as iron or zinc instead of mercury.

In my invention phthalic anhydride is prepared by treating nitro-naphthalene with sulphuric acid in the presence of iron or other suitable metal, which may be used for the reduction of nitro-compounds. The process of treatment of my invention is as follows:

In a suitable vessel, 450 kilos of ordinary sulphuric acid of 65° Bé. are heated to 150–160° C.; and then 35 kilos of nitro-naphthalene is added. The latter is then fused into the sulphuric acid, after which from 80 to 90 kilos of iron borings or zinc dust are added thereto under agitation. The reaction is very vigorous, all gases such as sulphur dioxide, carbon dioxide, etc., being allowed to escape. A temperature of 200° C. is maintained until all such gases are driven off. The temperature is then raised about 300° C. and phthalic anhydride is driven off and recovered by condensation under proper sub-atmospheric pressure.

The reason why the process of my invention produces phthalic anhydride is as follows:

When nitro-naphthalene is reduced according to the ordinary process, naphthylamine is produced by the following equation:—

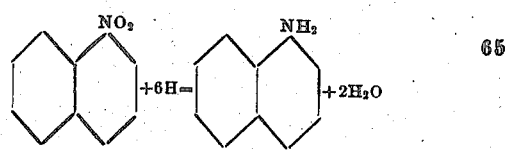

In the process of my invention, however, it is reduced to naphthalene instead of naphthylamine on account of its vigorous reduction under the high temperature with a large amount of sulphuric acid and such a metal as iron borings by the following equation:—

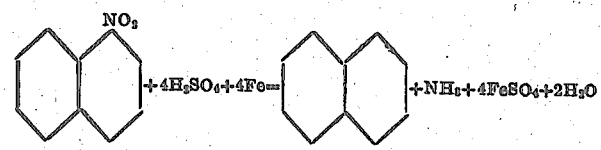

Such naphthalene produced as above is directly oxidized with sulphuric acid as soon as it is produced and thus phthalic anhydride is produced by the following equation:—

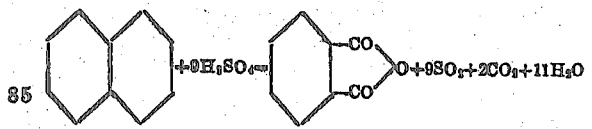

In the process of my invention, phthalic anhydride can be easily produced with ordinary sulphuric acid but more concentrated sulphuric acid or fuming sulphuric acid may be used for the purpose to procure better yield.

Having now particularly described the nature of my said invention and in what manner the same is to be performed, what I claim is:—

1. The process of producing phthalic anhydride which consists in causing sulphuric acid to be heated to below 160° C., and brought into contact with, and to act on nitro-naphthalene in the presence of iron until reaction ceases, then increasing the temperature to substantially 300° C. and recovering the phthalic anhydride.

2. The process of producing phthalic anhydride which includes treating nitro-naphthalene with sulphuric acid in the presence of a reducing metal, and thereafter recovering the phthalic anhydride at a subatmospheric pressure.

3. The process of producing phthalic anhydride which includes causing sulphuric acid to act on nitronaphthalene at a temperature of approximately 200° C. until reaction is complete, then increasing the temperature of the remaining reaction product, and volatilizing the phthalic anhydride out of said product and condensing the same.

In testimony, that I claim the foregoing as my invention, I have signed my name in the presence of two subscribing witnesses.

HIDEMATSU SASA. [L. S.]

Witnesses:
SHIGETOSHI SAKABE,
KANAE MORO.